UNITED STATES PATENT OFFICE.

HENRI REESER, OF PARIS, FRANCE.

INCANDESCIBLE BODY.

SPECIFICATION forming part of Letters Patent No. 669,101, dated March 5, 1901.

Application filed July 3, 1899. Serial No. 722,678. (No specimens.)

*To all whom it may concern:*

Be it known that I, HENRI REESER, a subject of the Queen of Holland, residing at Paris, France, have invented certain new and useful Improvements in or Relating to the Production of Incandescent Light, of which the following is a specification.

This invention relates to the production of incandescent light in which a new material is employed which can be used as an incandescent body either for the purpose only of obtaining the automatic ignition of gas or other combustible vapors or for the purpose of obtaining the automatic ignition and at the same time serving as an incandescent and durable mantle. The basis of this new material is formed by polinium. Polinium is a metal absolutely different from the following, which contain platinum ore: platinum, palladium, ruthenium, osmium, iridium, and rhodium. It differs from them especially as regards its specific gravity. It absorbs as much as seventy-five times its own volume of hydrogen. It changes directly in the open air alcohol into vinegar, sulfurous acid into sulfuric acid, and hydrogen into water. It also possesses the property of determining at ordinary temperatures the combination of hydrogen not only with oxygen, but also with all other gaseous or evaporable metalloids and their mixtures. To extract it from the platinum mineral containing it, one proceeds as follows: The mineral, reduced to powder, is first freed of any traces of magnetic iron it might contain by stirring it with magnets. The powder is next heated to volatilize any traces of mercury. The powder is now treated with aqua-regia, which is evaporated. The residue is again treated with aqua-regia, the operation being repeated until no more of the residue is dissolved by this solvent. The solutions thus obtained contain platinum, palladium, polinium, rhodium, ruthenium, much iridium, and a little copper. The residue contains a little osmium in shining particles. The solution is then diluted with fifteen times its volume of water, and, at ordinary temperature, chlorid of ammonium is added, this resulting in a solution of the double chlorid of platinum and ammonium, which is separated from the residue by means of a simple filter. The red precipitate is then calcined in a porcelain crucible and treated with aqua-regia containing a weak proportion of hydrochloric acid. The platinum contained in the precipitate is dissolved, while the iridium with which the former was combined remains in the precipitate. The treatment with the chlorid of ammonium is repeated until the precipitate becomes of a decidedly-yellow color. By calcining this yellow double chlorid of ammonium and platinum the whole of the platinum is obtained in the state of a pure gray sponge. The other metals present in the filtered liquor are extracted in the following manner: The liquid is allowed to stand in a large vessel containing zinc plates, which will result in a deposit at the bottom of the vessel. This deposit is washed with weak aqua-regia, so as to dissolve as little as possible of the iridium and palladium. The precipitate remaining after decanting is then treated with a solution containing thirty grams of carbonate of soda and thirty grams of cyanid of mercury, which results by filtration in a liquid containing iridium in a state of cyanid, the other metals and a black powder containing pure iridium in the state of black powder. The liquor mentioned above is left at an ordinary temperature in a closed vessel for several hours, when all the remaining palladium will be found in a metallic state. The liquid is decanted and receives fifteen to thirty grams of hydrochloric acid to each liter. This is evaporated until dry, and the dry deposit is treated with alcohol at 93°, which will result in a liquid containing all the rhodium and polinium. The liquor is evaporated on a water-bath, and the residue of the filter is heated, washed, and calcined, resulting finally in a yellow powder, which constitutes the metal polinium.

To produce with polinium a solid resisting mass capable only of automatically effecting the ignition of the gas or combustible vapor, I dissolve the metal in aqua-regia and allow the solution to be absorbed by a fire-resistant mass, such as a mixture of asbestos threads or material and of plaster-of-paris and animal-black in powder after the three ingredients have been soaked in a diluted solution of collodion. The mass is well triturated and is then formed in hot molds under pressure into any desired shape. This mass molded in the shape, say, of a ball or lozenge when held into a jet of gas or other combustible vapor will ignite it. The collodion used as above described acts as a binding material and disappears when the ball or pellet or other-shaped body is formed.

In order to obtain a durable unbreakable body which can be used for incandescent lighting fed by gas or other combustible vapor and with automatic ignition, alloys are formed containing polinium, either free or in combination with other bodies, and make use of them in the shape of threads or of tissue or in any other form capable of becoming incandescent. As an example, an alloy may be formed containing five parts of polinium, ten parts of molybdenum, sixty-five parts of tungsten, and twenty parts of antimony. This very refractory and ductile alloy will give threads of one-hundredth of a millimeter in thickness, with which metallic woven fabrics can be produced having, say, sixty-five meshes to the square centimeter. This supple and resisting fabric can be made in the form of a cylinder or mantle to replace the ordinary incandescent mantle and can be placed like it over the ordinary incandescent burners and possesses the property of giving an incandescent light in conjunction with gas or combustible vapor.

I claim—

1. A substance, capable of causing the ignition of gas or combustible vapor comprising a refractory body heated with a solution of polinium substantially as described.

2. A substance capable of causing the ignition of gas or combustible vapor comprising a salt of polinium, incorporated in a mixture of asbestos, plaster and animal-black previously treated with collodion, substantially as described.

3. A substance capable of causing the ignition of gas or combustible vapor and of serving, at the same time, as an incandescent mantle, comprising a metallic fabric formed of threads of a refractory alloy containing polinium, in a free state or in combination with tungsten, molybdenum and antimony, substantially as described.

4. The combination of an incandescent mantle, made of threads of an alloy consisting of polinium with tungsten, molybdenum and antimony, with an ignition-body made of polinium in combination with a refractory vehicle substantially as described.

5. The process of making a material for automatically igniting gas or combustible vapor consisting in forming a mixture of asbestos, plaster and animal-black, treating said mixture with collodion and finally impregnating it with a solution of polinium, substantially as described.

6. A material for automatically igniting gas or combustible vapor comprising a fire-resistant vehicle containing a salt or salts of polinium substantially as described.

7. An incandescent mantle consisting of threads of an alloy of rare metals including polinium substantially as described.

8. An incandescent mantle consisting of threads of an alloy of polinium, molybdenum, tungsten and antimony substantially as described.

In testimony whereof I have hereto set my hand in the presence of the two subscribing witnesses.

HENRI REESER.

Witnesses:
 ALBERT MAULVAULT,
 EDWARD P. MACLEAN.